(12) United States Patent
Wang et al.

(10) Patent No.: US 11,995,914 B2
(45) Date of Patent: May 28, 2024

(54) FAST FACE IMAGE CAPTURE SYSTEM

(71) Applicant: ASSA ABLOY GLOBAL SOLUTIONS AB, Stockholm (SE)

(72) Inventors: Sunny Wang, Saratoga, CA (US); Dan Potter, Monterey, CA (US); Keith W. Hartman, Redwood City, CA (US)

(73) Assignee: ASSA ABLOY GLOBAL SOLUTIONS AB, Stockholm (SE)

( * ) Notice: Subject to any disclaimer, the term of this patent is extended or adjusted under 35 U.S.C. 154(b) by 0 days.

(21) Appl. No.: 17/506,252

(22) Filed: Oct. 20, 2021

(65) Prior Publication Data

US 2022/0108560 A1     Apr. 7, 2022

Related U.S. Application Data

(62) Division of application No. 16/669,235, filed on Oct. 30, 2019, now Pat. No. 11,176,357.

(51) Int. Cl.
*G06V 40/16*     (2022.01)
*G06T 5/00*     (2006.01)
(Continued)

(52) U.S. Cl.
CPC ............ *G06V 40/172* (2022.01); *G06T 5/004* (2013.01); *G06T 5/20* (2013.01); *G06T 7/246* (2017.01);
(Continued)

(58) Field of Classification Search
CPC .......... G06K 2209/15; G06K 9/00362; G06K 9/00664; G06K 9/00671; G06K 9/00805;
(Continued)

(56) References Cited

U.S. PATENT DOCUMENTS 7,643,671 B2   1/2010   Dong et al.
10,386,712 B1   8/2019   Yett
(Continued)

FOREIGN PATENT DOCUMENTS

WO     2021086758 A1   5/2021

OTHER PUBLICATIONS

Evaluation of Face Recognition Technologies for Identity Verification in an eGate based on Operational Data of an Airport (Year: 2015).*

(Continued)

*Primary Examiner* — Nizar N Sivji
(74) *Attorney, Agent, or Firm* — Schwegman Lundberg & Woessner, P.A.

(57) ABSTRACT

A fast face capture system and process for identifying an individual as the individual walks through a designated area is described. A set of raw images is streamed from at least one camera for detecting individuals entering the designated area. The images are searched for a face. If a face is detected, a tracking ID is assigned; and a timer and face tracking is commenced to obtain a sequence of candidate images for each individual as the individual walks through the designated area. A maximum quality image is selected from the sequence of candidate images for each individual based on at least one quality metric, the elapsed time, and the quality select count in the sequence of the candidate images. The maximum quality image is submitted for matching with a verified image of the person. The invention has particular application to security check points for quickly matching the face of the moving person with a previously acquired and verified identity.

10 Claims, 8 Drawing Sheets

(51) Int. Cl.
    *G06T 5/20*     (2006.01)
    *G06T 7/246*     (2017.01)

(52) U.S. Cl.
    CPC .. *G06V 40/169* (2022.01); *G06T 2207/30201* (2013.01); *G06T 2207/30232* (2013.01)

(58) Field of Classification Search
    CPC .. G06K 9/00288; G06K 9/00275; G06T 7/70; G06T 7/292; G06T 2207/30196; G06T 5/004; G06T 5/20; G06T 7/246; G06T 2207/30232; G06T 2207/30201
    See application file for complete search history.

(56) References Cited

U.S. PATENT DOCUMENTS

| | | | |
|---|---|---|---|
| 10,776,613 B1* | 9/2020 | Schneider | G06Q 10/0832 |
| 10,839,203 B1* | 11/2020 | Guigues | G06V 10/774 |
| 10,990,945 B2* | 4/2021 | Bengtsson | G06T 7/70 |
| 2007/0266312 A1* | 11/2007 | Ayaki | H04N 23/632 |
| | | | 715/273 |
| 2009/0051779 A1 | 2/2009 | Rolston | |
| 2011/0279368 A1 | 11/2011 | Klein et al. | |
| 2012/0020518 A1* | 1/2012 | Taguchi | G06T 7/292 |
| | | | 382/103 |
| 2013/0195316 A1* | 8/2013 | Bataller | G06V 40/172 |
| | | | 382/103 |
| 2014/0146169 A1 | 5/2014 | Ollivier et al. | |
| 2014/0201844 A1 | 7/2014 | Buck | |
| 2014/0277735 A1* | 9/2014 | Breazeal | B25J 9/0003 |
| | | | 700/259 |
| 2015/0363636 A1* | 12/2015 | Tate | G06V 40/173 |
| | | | 382/118 |
| 2016/0049026 A1 | 2/2016 | Johnson | |
| 2016/0247341 A1 | 8/2016 | Talwerdi | |
| 2017/0068842 A1 | 3/2017 | Garcia et al. | |
| 2017/0091550 A1 | 3/2017 | Feng et al. | |
| 2017/0091561 A1* | 3/2017 | Pham | G06V 40/20 |
| 2017/0351907 A1 | 12/2017 | Bataller et al. | |
| 2018/0246570 A1 | 8/2018 | Coleman et al. | |
| 2018/0374233 A1* | 12/2018 | Zhou | G06F 18/22 |
| 2019/0050634 A1* | 2/2019 | Nerayoff | G06F 18/22 |
| 2019/0130167 A1* | 5/2019 | Ng | G06V 40/166 |
| 2019/0146246 A1 | 5/2019 | Fonte et al. | |
| 2019/0294932 A1* | 9/2019 | Rodriguez | G06F 16/51 |
| 2020/0125849 A1* | 4/2020 | Labrecque | G06Q 10/087 |
| 2020/0386887 A1* | 12/2020 | Pratt | G01S 17/89 |

OTHER PUBLICATIONS

Abadi et al., TensorFlow: A system for large-scale machine learning, 12th USENIX Symposium on Operating Systems Design and Implementation (OSOi 16), USENIX Association (2016), pp. 265-283.
Cai et al., Towards a Practical PTZ Face Detections and Tracking System (2013).
Grother et al., Face Recognition VEndor Test (FRVT) Part 2 Identification (Year 2019).
Hongo, Hitoshi, et al, Focus of Attention for Face and Hand Gesture Recognition Using Multiple Cameras, 2000.
King, D. E. "Dlib-ml: A Machine Learning Toolkit" (2009).
Mosberger, Rafael, et al, A Customized Vision System for Tracking Humans Wearing Reflective Safety Clothing from Industrial Vehicles and Machinery, Sensors 2014, 14, 17952-17980; doi:10.3390/sl41017952.
NIST Internal Report 8280, Natl. Inst. Stand. Technol. Interag. Intern. Rep. 8280, 81 pages (Dec. 2019).
PCT ISRWO of PCT/US2020/057210 dated Mar. 18, 2021.
PCT ISRWO of PCT/US21/40577 dated Nov. 8, 2021.
Sherrah, Jamie, et al, Evaluation of similarity measures for appearance-based multi-camera matching, 2011.
Sheu, Ruey-Kai, et al, STAM-CCF: Suspicious Tracking Across Multiple Camera Based on Correlation Filters, Sensors 2019, 19, 3016; doi: 10.3390/s19133016.
Szegedy et al., Rethinking the Inception Architecture for Computer Vision, arxiv.org/pdf/1512.00567v3 [cs. CV].
Wheeler, Frederick W., et al, Face Recognition at a Distance System for Surveillance Applications, 2010.

* cited by examiner

FAST FACE IMAGE CAPTURE SYSTEM

CROSS-REFERENCE TO RELATED APPLICATIONS

None.

BACKGROUND OF THE INVENTION

1. Field of the Invention

This invention relates to face recognition systems, and particularly, to face recognition systems for capturing the image of a face of a moving person.

2. Description of the Related Art

Face recognition systems are gaining popularity for identifying or confirming a person's identity in a number of different venues such as, for example, security check points. A real time image of the candidate's face is submitted for matching with a previously-acquired confirmed (or validated) image of the person's face. In a typical arrangement, the candidate poses or holds still for the camera, and an image of the candidate's face is acquired. Other examples of face matching systems are described in the U.S. Pat. No. 7,643,671.

However, these systems have a number of drawbacks. Generally, each person must stop, face the camera, and hold still while the image is obtained. This is slow, tedious, and creates long wait times. Additionally, if the person is moving, an image suitable for image matching may not be acquired within a convenient amount of time, or worse, not at all.

Notwithstanding the above, an improved face matching system is desired that can accurately capture high quality images of a person's face as the person is moving. Additionally, an improved face matching system that can rapidly capture high quality images of a person's face as the person is walking and without requiring the person to wait is desired.

SUMMARY OF THE INVENTION

A face recognition system for identifying a person as the person is moving through a designated area includes a camera aimed at the designated area; and at least one processor operable to perform face tracking of the person as the person moves through the designated area based on receiving a plurality of consecutive images from the camera. The processor is further operable to perform image selecting by selecting at least one candidate image for matching from the plurality of consecutive images being tracked based on an image quality metric, time elapsed, and an image quality count.

In embodiments, the processor is further operable to perform image selecting using a trained classifier.

In embodiments, the system further includes a face matching engine, and the processor is further operable to send the at least one candidate image to the face matching engine, and wherein the image quality count is adjusted with each candidate image sent to the face matching engine.

In embodiments, the processor is operable to continue face tracking and image selecting for the person until the image quality count reaches a maximum count value. In embodiments, the maximum count value is less than 5.

In embodiments, the system further comprises a guidance feature to corral the person walking through the designated region. In embodiments, the guidance feature is a handrail. In some embodiments, the guidance features is presented by a display or an augmented reality projector using projection mapping techniques.

In embodiments, the system further comprises a display, and the processor and display are operable to show on the display live images of the face of the person during face tracking.

In embodiments the processor is operable to superimpose graphics on the live images enclosing the face during face tracking.

In embodiments, the processor is operable to perform a transformation on the live images during the face tracking to encourage the person to look at the display thereby obtaining a higher quality image.

In embodiments, the transformation is selected from the group consisting of blurring (blurred around subject's face); cropping (face cropped image); configure face to line image; configure face cartoon image; unsharp masking; noise suppression; illumination adjustment; high dynamic range; rotation (roll) correction; emoji-type face representation; and animal-type face representation.

In embodiments, the system further comprises a housing enclosing the processor, camera and display.

In embodiments, the system further comprises display ring, and wherein the display ring is operable to change visually based on the images of the person walking through the designated area.

In embodiments, the processor is further operable to monitor the time elapsed for face tracking of the person, and terminate face tracking for the person after the time elapsed reaches a maximum time elapsed. In embodiments, the maximum time elapsed is equal to or greater than 2 seconds.

In embodiments, the image quality metric is selected from the group consisting of face size ($F_{SIZE}$) or inter pupillary distance (IPD), Yaw Pitch Roll, and Laplacian variance.

In embodiments, the processor is operable to determine instructions for person moving based on the plurality of consecutive images. In embodiments, the processor is operable to determine when the person has exited the designated area.

In embodiments, the processor determines the person has exited the designated area when a face size (Fsize) of the person is greater than a maximum face size (Fmax) and the person is tracked outside the field of view of the camera.

In embodiments, the system further comprises a display, and is operable to indicate on the display for a next person to enter the designated area. In embodiments, the instructions direct said person to enter a second area for further identification.

In embodiments, the system further comprises a remote server, and wherein the face matching engine is located on the remote server. The candidate image that meets the criteria for being stored as the maximum quality image is sent from the local memory or processor to a remote storage such as a server. The data may be sent wirelessly or otherwise.

In embodiments, the face matching engine interrogates the at least one candidate image of the person to confirm the identity of the person.

In embodiments, the processor is operable to monitor an enrollment state of the system corresponding to a total number of persons whose identity has been confirmed by the face matching engine.

In embodiments, the processor is further operable to perform image selecting based on a cue arising from the person walking. The cue can be visual-based. Examples of cues include, without limitation, a badge, article of clothing, band, flag, sign, and gesture.

In embodiments, the system further comprises a visual privacy warning feature to direct the person into the designated area for face capture and alternatively to a face capture exclusion area.

In embodiments, a face recognition system for identifying a person as the person moves through a designated area comprises: a face detection engine for detecting a face of the person when the person enters the designated area and based on a first sequence of images generated by a camera as the person enters the designated area; a tracking engine for tracking the face of the person as the person moves through the designated area and based on a second sequence of images generated by the camera as the person traverses the designated area; and a quality select engine for selecting a maximum quality image for each person traversing the designated area.

In embodiments, the system further comprises a face matching engine for matching the maximum quality image with a validated image of the person.

In embodiments, the system further comprises a display module for displaying tracking of the person in real time.

In embodiments, the system further comprises a guidance feature to corral the person towards the camera as the person traverses the designated area.

In embodiments, the system further comprises a housing enclosing the camera, detecting engine, quality select engine, tracking engine, and display module.

In embodiments, the invention includes a face recognition method for identifying individuals based on a maximum quality image of the face of the individual as each individual moves through a designated area. The method comprises: (a) streaming images from at least one camera for each individual entering the designated area; (b) face detecting by searching the streamed images for a face until a face of an individual is detected; (c) face tracking; and (d) maximizing image quality by repeating the face tracking step for each individual if the elapsed time is within a maximum time and the quality select count is within a threshold count range.

In embodiments, the step of face tracking is performed by: (i) assigning a tracking ID and a quality select count to the individual; (ii) tracking the face of the individual to obtain at least one candidate image of the face of the individual as the individual moves through the designated area; (iii) timing the individual during tracking for an elapsed time; (iv) storing as the maximum quality image the at least one candidate image for face matching if an image quality metric is within a threshold quality range and higher than that of a previously-stored quality image; and (v) adjusting the quality select count for the individual based on whether the at least one candidate image was stored as the maximum quality image.

In embodiments, the step of storing is carried out remotely from the designated area. The candidate image that meets the criteria for being stored as the maximum quality image is sent from a local memory or processor to a remote storage such as a server. The data may be sent wirelessly or otherwise.

In embodiments, the method further comprises, subsequent to the step of maximizing image quality, face matching the maximum quality image with a validated image of the face of the individual.

In embodiments, the step of maximizing is based on the quality image count being less than or equal to 5, and optionally less than or equal to 3.

In embodiments, the method comprises displaying a live stream of images of the individual being tracked during the tracking step.

In embodiments, the method comprises superimposing graphics on the live stream of images of the individual being tracked to encourage the individual to look at the camera.

In embodiments, the method comprises terminating the tracking step for the individual when the elapsed time is equal to or greater than 2 seconds.

In embodiments, the method further comprises displaying an instruction to enter the designated area until tracking is commenced for a next individual.

In embodiments, at least three (3) candidate images are generated during the step of tracking.

In embodiments, the quality metric being selected from the group consisting of face size or interpupillary distance, Yaw Pitch Roll, and Laplacian variance.

In embodiments, the invention includes a face recognition method for identifying individuals based on a maximum quality image of the face of the individual as each individual moves through a designated area. The method comprises: (a) streaming images from at least one camera for each individual entering the designated area; (b) face detecting by searching the streamed images for a face until a face of an individual is detected; (c) assigning a tracking ID and a quality select count to the individual; (d) commencing a face tracking timer for the individual; (e) tracking in real time the face of the individual to obtain a current candidate image of the face of the individual as the individual moves through the designated area; (f) delegating the current candidate image as the maximum quality image for face matching if certain criteria are met; (g) maintaining a quality select count for the individual corresponding to a total number of current candidate images delegated; and (h) continuously updating the maximum quality image for the individual by repeating steps (e)-(g) so long as the quality select count is less than a threshold count and an elapsed tracking time measured by the face tracking timer is less than a maximum time.

In embodiments, the step of delegating is performed if (i) an image quality metric of the current candidate image is within a threshold quality range and (ii) in the event the maximum quality image had been previously delegated, the current candidate image has a higher quality rating than the previously delegated maximum quality image.

In embodiments, the step of delegating is carried out by saving the delegated candidate image in a storage located remote to the designated area. The candidate image that meets the criteria for being stored as the maximum quality image is sent from the local memory or processor to a remote storage such as a server. The data may be sent wirelessly or otherwise.

In embodiments, subsequent to the step of updating, the method further includes face matching the delegated candidate image with a validated image of the face of the individual.

The description, objects and advantages of embodiments of the present invention will become apparent from the detailed description to follow, together with the accompanying drawings.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Described herein is a fast face capture system and related methods.

Face Capture Overview

With reference to FIGS. 1A-1D a face capture system 10 in accordance with an embodiment of the invention is illustrated for capturing the image of a candidate's face as the candidate 20 is walking through region (R). The system 10 is shown having a face recognition device 30 and a pair of beam sensors 40, 42, each of which is triggered when the person crosses its beam. As discussed further herein, the recognition device 30 can include a plurality of cameras for obtaining images of the candidate 20 and a display to provide instructions to the candidate for walking through the various regions R0, R1, R2, and R3.

Figure 1A:
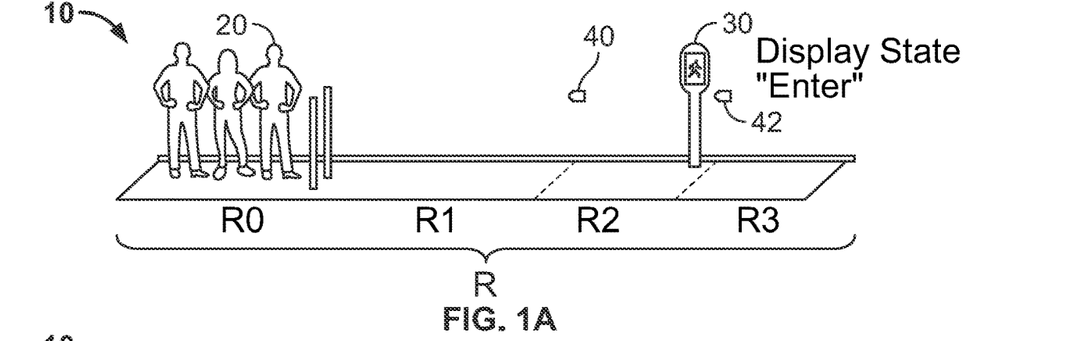
FIGS. 1A-1D are sequential illustrations of a face capture system in accordance with an embodiment of the invention for capturing the image of a candidate's face as the candidate is walking.

Initially, and with reference to FIG. 1A, the candidate 20 is shown waiting in region R0. The recognition device 30 is operable to exclude images of the face of the candidate while the candidate is in region R0. In embodiments, the recognition device 30 excludes faces having a size less than a threshold size. In a particular embodiment, the recognition device excludes a face detected with less than 150 pixels. Naturally, if no faces are detected, no images need be excluded, and no images are submitted for matching. The length of R0 may vary depending on the application. An exemplary length of R0 is greater than 10 feet.

Figure 1B:
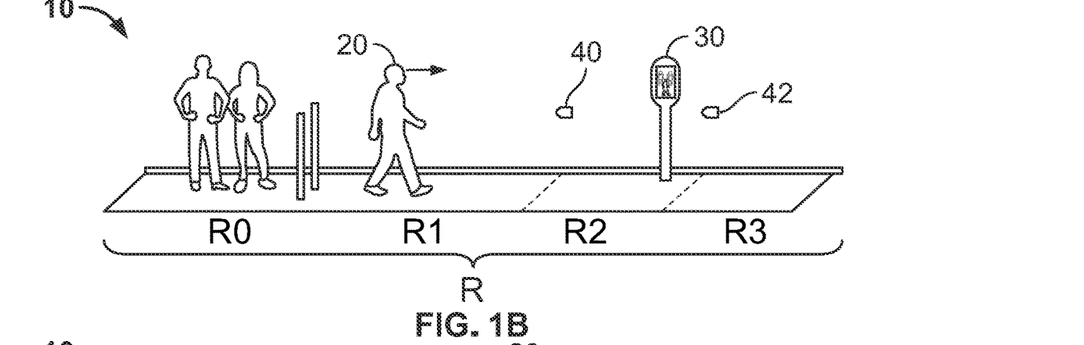

With reference to FIG. 1B, candidate 20 is shown walking through region R1. In this face tracking stage, the recognition device 30 is operable to detect and track the face of the candidate 20. In embodiments, the recognition device 30 detects a face having a size within a first predetermined range and can start a face detected timer ($t_0$) for the candidate. In a particular embodiment, the first predetermined range at which to start tracking is 150 to 180 pixels. In embodiments, the determination of whether to submit a detected image is based on additional constraints including but not limited to yaw, pitch, and roll (YPR), and the Laplacian variance (LV), blur or sharpness factor. In a preferred embodiment, in addition to the above described size constraints, a candidate image is submitted for matching if the LV across the face is greater than 8, and the max(YPR) is less than 10.

Additionally, the length of R1 may vary depending on the application. An exemplary length of R1 ranges from 3 to 10 feet.

Figure 1C:
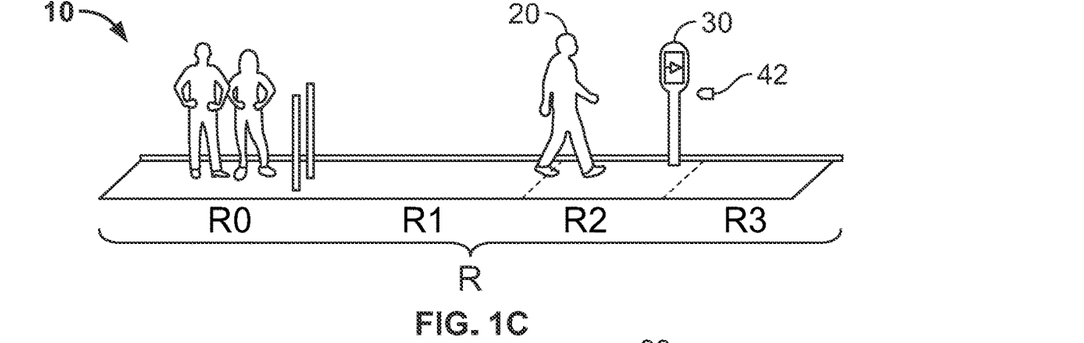

With reference to FIG. 1C, the candidate 20 is shown walking through region R2. In this image quality assurance stage, the recognition device 30 is operable to continue tracking the face of the candidate 20 and optionally submits one or more images for matching based on a quality assurance algorithm, discussed further herein.

In embodiments, if a real-time image is detected while the candidate is walking through region R2, and the real-time image is better than a previously submitted image (or if no previous image was submitted), the real-time image will be submitted for matching, replacing any previously submitted images for the candidate. In this manner, the system can continuously update or improve the quality of captured images to be submitted. Without intending to being bound to theory, the latter acquired image is deemed a higher quality than a former acquired image based on the assumption that the candidate is walking towards the camera and the face in the latter image is larger than the face in the previous image. Of course, this assumption is not true if the candidate is not walking towards the camera, or no longer within the field of view. Optionally, additional quality metrics are applied to further screen for high quality images during this stage including, for example, and without limitation, face size, sharpness, and YPR. In embodiments, the recognition device 30 evaluates and screens for faces having a size between 180 to 500 pixels. In a preferred embodiment, a candidate image is submitted for matching during this stage if, in addition to the above described size constraints, the LV is greater than 8, and the max(YPR) is less than 10.

Additionally, the length of R2 may vary depending on the application. An exemplary length of R2 ranges from 0 to 3 feet.

Figure 1D:
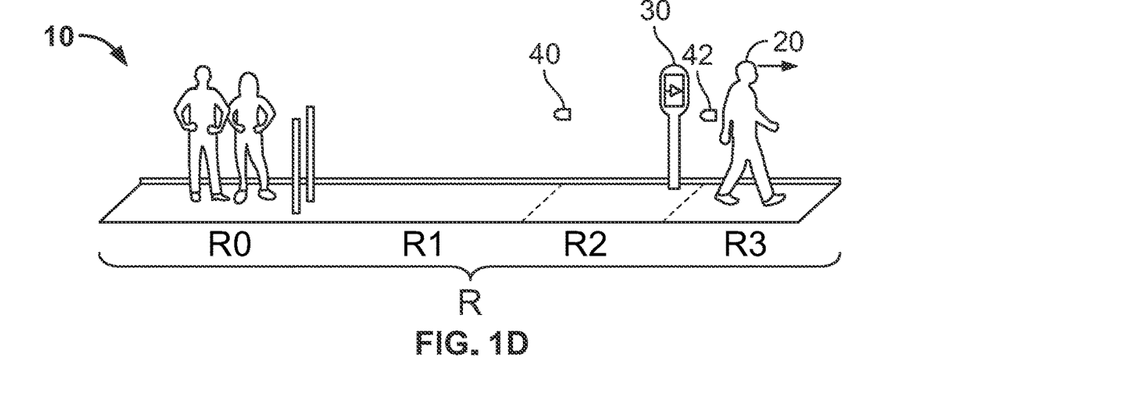

With reference to FIG. 1D, the candidate 20 is shown walking downstream of the recognition device in region R3. In this exiting or departure stage, the system is operable to (a) accurately determine whether the candidate being tracked has exited the quality assurance region R2 and (b) restart the process for the next candidate. In embodiments, if the previously tracked candidate is no longer within the camera's field of view for 5 or more frames, and/or optionally the timer for the candidate is greater than 5 seconds, the candidate shall be considered to have exited the region R2.

Additionally, R3 is any distance behind the recognition device.

As mentioned above, the system 10 can include beam sensors 40, 42 which serve to identify whether the candidate has entered and exited region R2, as well as the time elapsed for the candidate to move through region R2. However, the invention is not intended to be so limited.

In embodiments of the invention, at least one image of the candidate's face is submitted for matching. The quality of the image is optimized based on a quality assurance algorithm described herein. The time to track and capture and submit an image of the candidate is fast and in embodiments, the time is less than about 3 seconds, and more preferably less than 1 seconds. An advantage of the invention is to track and capture the image without the person slowing down, or stopping. In embodiments, as discussed further herein, the system is adapted to provide a message direction to the person in real time. For example, the display may instruct the person to avoid stopping and continue in a specific direction, or to proceed to another location such as a seat or gate.

Additionally, in embodiments, the quality assurance stage corresponding to region R2 is performed in less than or equal to 1 seconds.

Optionally, the number of images sent or submitted for matching is limited to a maximum count. In embodiments, the maximum count of submitted images per candidate ranges from 2 to 10, and in some embodiments less than or equal to 5, and most preferable less than or equal to 3. Limiting the number of submitted images per candidate serves to increase the speed of the system so more candidates can walk through the region R.

Figure 2:
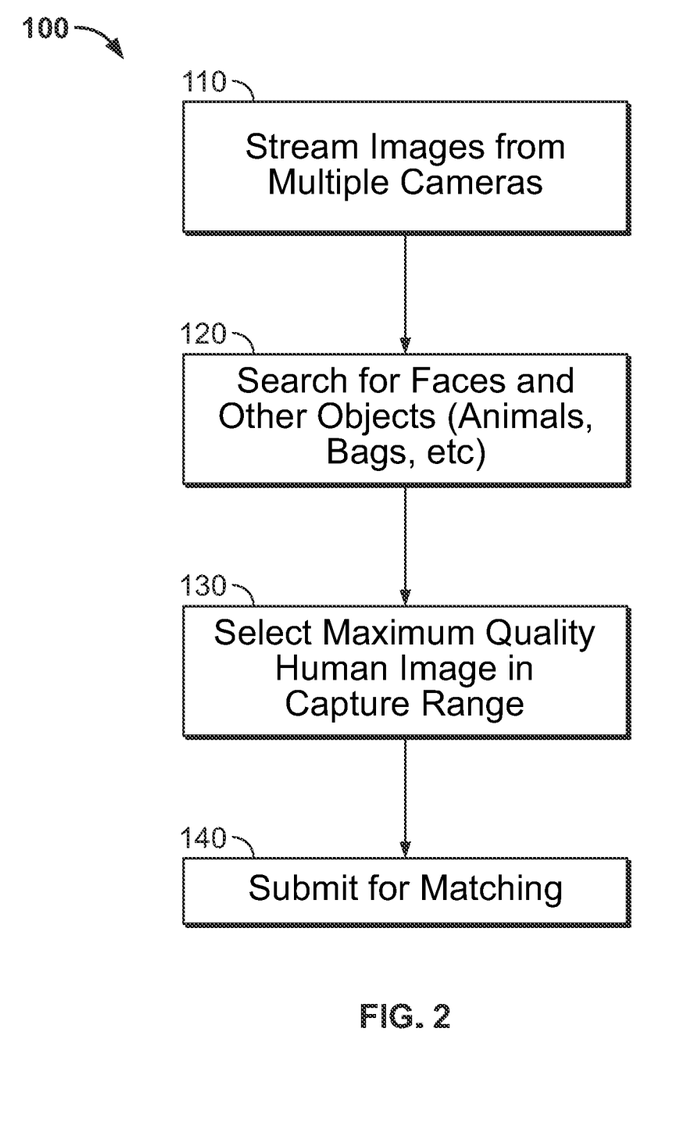
FIG. 2 is a flow chart of a face capture process in accordance with an embodiment of the invention.

FIG. 2 is a flowchart of a process 100 for submitting images of a face of a candidate for matching in accordance with an embodiment of the invention. To facilitate understanding of the process 100, and the performance of exemplary steps of the process, reference is also made to the components and functionality shown in the face capture system 210 shown in FIG. 3.

Step 110 states to stream images from multiple cameras. In a preferred embodiment, one or more cameras and sensors 200 are enclosed in the recognition device 210 shown in FIG. 3. Examples of cameras, include without limitation, Leopard Imaging CMOS camera, model number LI-USB30-AR023ZWDRB (Freemont, California). The sensors and cameras may comprise their own image processing software 204. The cameras are preferably positioned downstream of the candidates, and aimed at the designated region (R).

With reference again to FIG. 2, step 120 states to search for faces and optionally other objects within the images. This step can be carried out by computer hardware 220 executing one or more software modules or engines 230. Examples of hardware includes processors 222 (e.g., CPU, GPU, or AIA), data storage 224, memory 226, and various image and graphics processing units 228.

Figure 3:
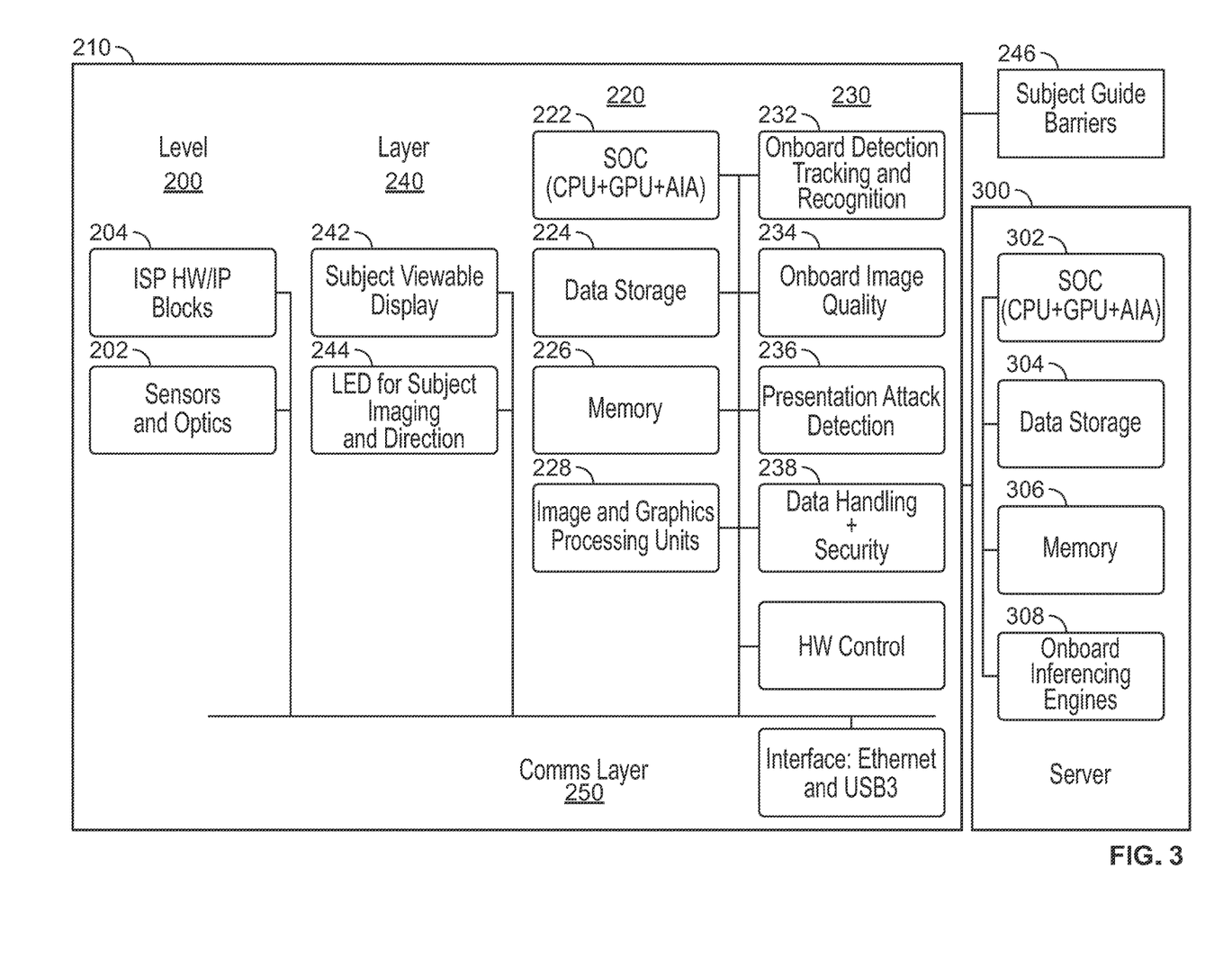
FIG. 3 is a block diagram of a face capture system in accordance with an embodiment of the invention.

A detection tracking and recognition engine or module 232 searches for faces and optionally other objects as the candidate walks towards the recognition device. A wide range of face and object detection and tracking algorithms may be employed on the system 210 by the processor 220. Non-limiting examples of suitable face and object detection and tracking algorithms include: the dlib face detector; and the JunshengFu/tracking-with-Extended-Kalman-Filter. The dlib face detector is stated to employ a Histogram of Oriented Gradients (HOG) feature combined with a linear classifier, an image pyramid, and sliding window detection scheme.

Additionally, a user interface or human factor layer 240 is shown in the system 210 of FIG. 3. In embodiments, a subject viewable display 242 assists in directing the person to walk in the designated area during the proper time, as well as to look towards the camera. Optionally, LED 244 such as a LED light ring surrounding the display is indicative of direction or visually changes based on position of the subject. As described further herein, other human factors can be included in the system including guide rails 246 and virtual or augmented reality type graphics to assist in guiding the candidate through the region and to look in the direction of the cameras.

With reference again to FIG. 2, step 130 states to select maximum quality human image in capture range. This step can be performed by the face recognition device 210 employing an image quality or quality assurance module 234, described further herein. The output of the quality assurance module 234 is a best or optimum image of the face of the candidate as he is walking through the designated region.

Step 140 states to submit for matching. This step submits an optimum image from step 130 to be matched with a pre-acquired (and validated) image of the person to be identified. A matching engine (not shown) can be included in the face recognition device 210, or a remote server 300, in which case a communication interface 250 is available to send the candidate's optimum image to the remote server. A server processor 302, data storage 304, and memory 306 are operable to rapidly determine whether the difference between the candidate image and a pre-acquired stored image is acceptable to confirm the person's identity. Examples of suitable matching engines 308 include, without limitation, the Algorithms evaluated by the NIST Face Recognition Vendor Test (FRVT).

Machine learning algorithms and inferencing engines 308 can be incorporated into the server 300 or device 210 for increasing the accuracy and efficiency of the above described steps, particularly, for increasing the accuracy and efficiency of face detection and matching. Examples of such algorithms include, without limitation, the algorithms evaluated by the NIST Face Recognition Vendor Test (FRVT).

Additionally, the system may be operable to recognize cues for categorizing individuals into groups (e.g., tour group, team, military, etc.) as well as to recognize an individual's clear intention (namely, acceptance) of being tracked for face matching. Cues may be visual-, audio-, or electromagnetic-based. Non-limiting examples of cues include badges, clothing, wrist bands, tags, RFID, voice, gestures including hand or face gesture, etc.

Figure 4A:
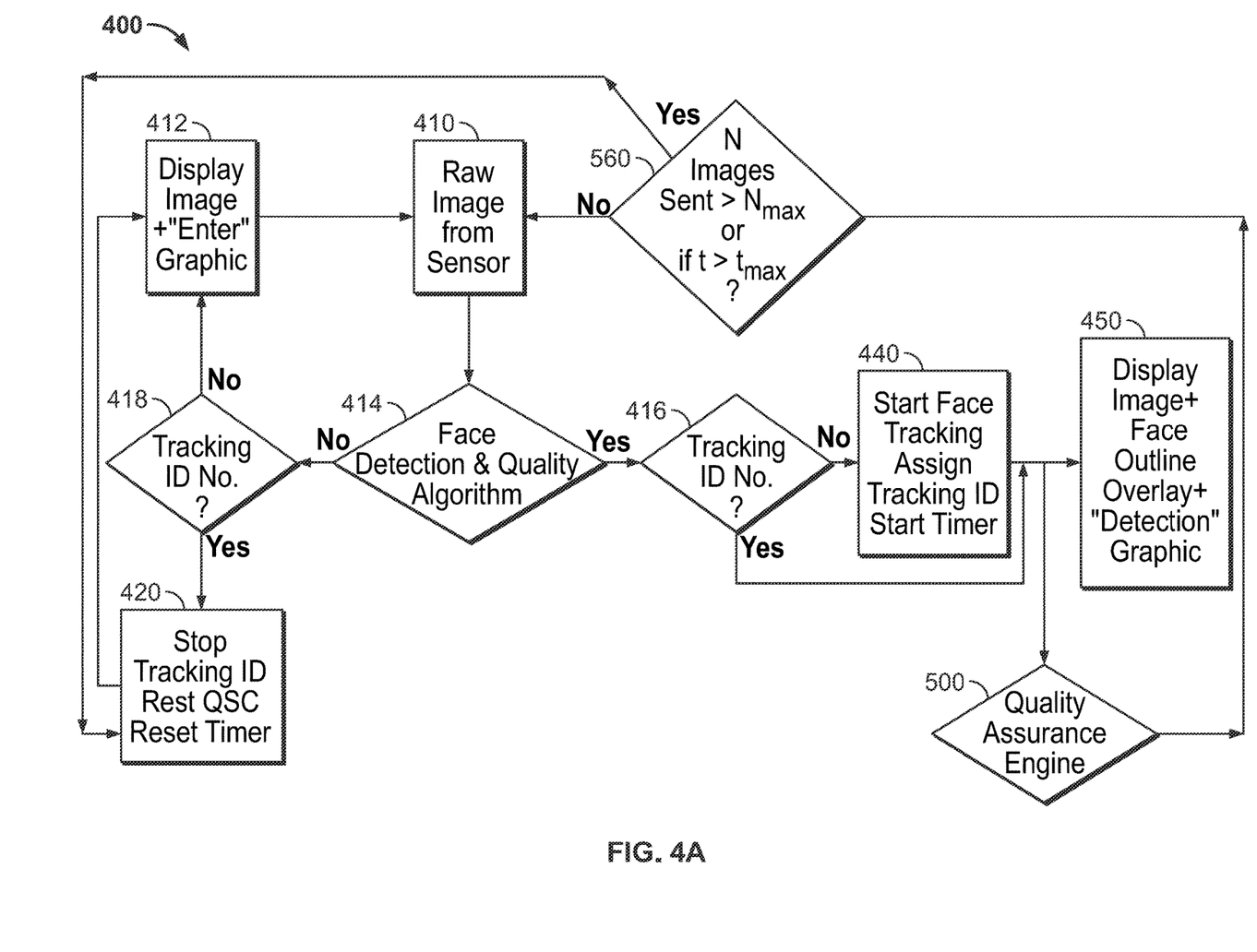
FIGS. 4A, 4B are flow charts illustrating a face capture process in accordance with an embodiment of the invention.

FIG. 4A is a flow chart illustrating a process 400 to guide a candidate through a designated area and capture an optimized image of her face.

Step 410 states to scan or stream raw images of the candidate. Simultaneously, and with reference to step 412, instructions are displayed for the candidate to 'enter' the designated area or region.

Step 414 immediately interrogates the stream of images for a person's face based on a minimum image quality metric. In embodiments, the initial raw images are considered acceptable if the inter pupillary distance (IPD) is at least 150, and each YPR value is less than 10.

Additionally, in preferred embodiments, a trained classifier is used to determine whether a face is present. Examples of trained classifiers include, for example, the dlib face detector. Id.

No Face Detected

In the event a face is not detected at step 414 (e.g., candidate falls or otherwise drops out of the FOV) or the image fails to pass the minimum quality threshold, the method proceeds to step 418.

Step 418 states to determine whether a tracking ID exists for the candidate.

If a tracking ID does not exist (e.g., the candidate is new), the process simply proceeds to step 412 described above. The candidate is instructed by the display to 'enter' (412), and the live stream of images (step 410) is interrogated for a face having a minimum level of quality (step 414).

If a tracking ID exists for the candidate (e.g., the candidate was being tracked but has fallen or leaned over to pick up a belonging), then the method proceeds to step 420. In embodiments, step 420 stops the current tracking ID, resets the timer, and resets a quality select counter (QSC), discussed further herein in connection with FIG. 4B. Following resetting the tracking ID, QSC, and timer, the candidate is instructed by the display to 'enter' (step 412), and the live stream of images (step 410) is interrogated for a face having a minimum level of quality (step 414).

Face Detected

In the event a face is detected and passes the minimum quality threshold at step 414, the method proceeds to step 416 for tracking.

Step 416 states to determine whether a tracking ID exists. If not, the process proceeds to step 440 and a tracking ID is assigned. Face tracking is commenced and the display simultaneously shows the stream of images with a graphic to indicate face tracking has commenced. In embodiments, the face is outlined or enclosed by a boundary that is overlaid with the image (450).

If, at step 416, a tracking ID already exists, then the process continues tracking the candidate, and the display indicates same.

In either case, the process 400 proceeds to a quality assurance phase 500, discussed in detail in connection with FIG. 4B.

Output from the quality enhancement engine 500 is interrogated at step 560 for whether the process should be (a) restarted for a new candidate, or (b) continued for the same candidate. As described further herein, thresholds for determining whether to continue or restart can be based on time elapsed, the number of images submitted for matching, candidate is outside the field of view, etc. In preferred embodiments, the process is restarted if the time elapsed is greater or equal to 10 seconds, more preferably 5 seconds, and in embodiments, 3 seconds. In another preferred embodiment, the process is restarted if 3 images of a candidate have been submitted for matching, discussed further below in connection with FIG. 4B.

Figure 4B:
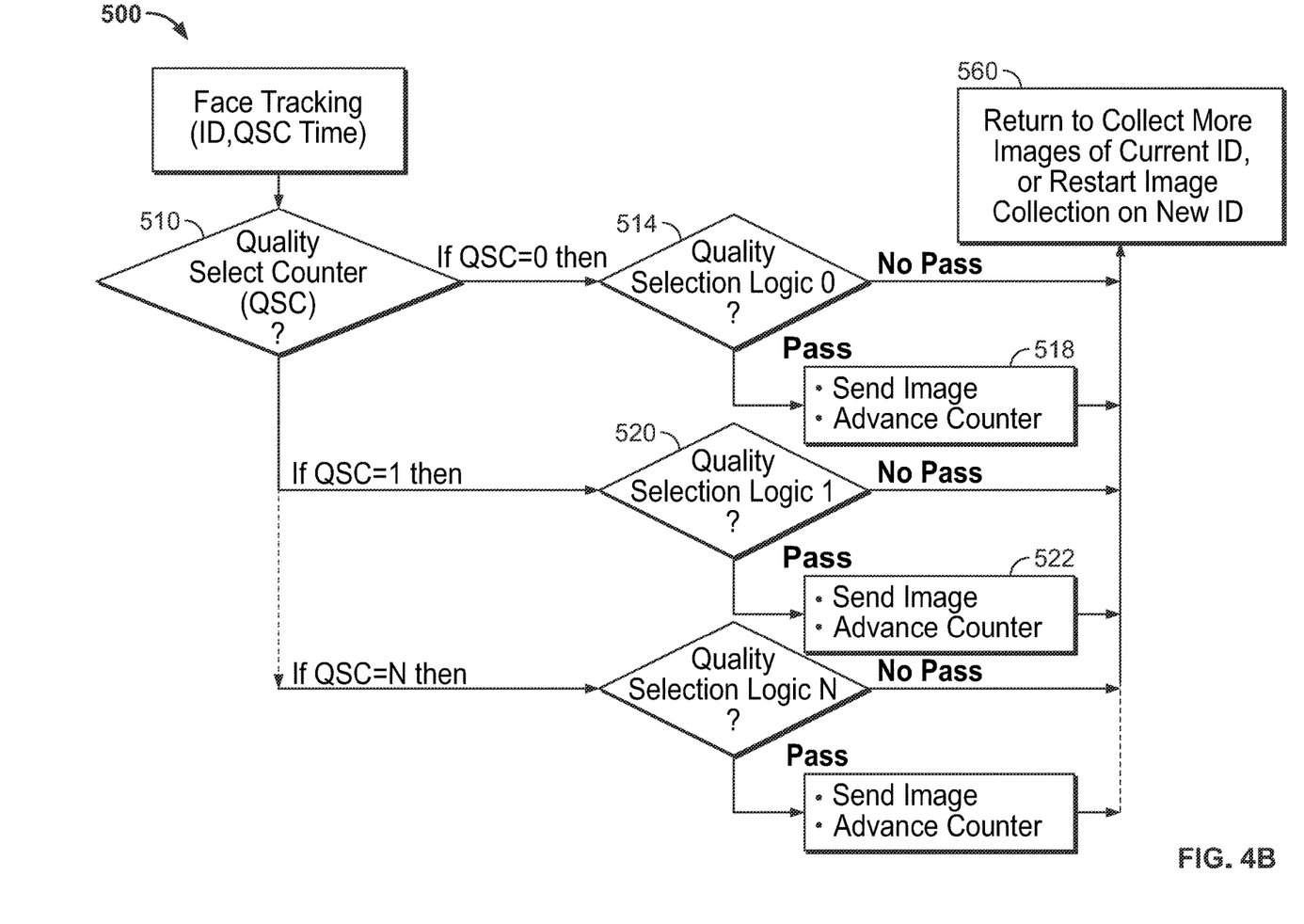

If it is determined to restart the process for a new candidate, step 420 stops the current tracking ID, resets the timer, and resets a quality select counter (QSC), discussed further herein in connection with FIG. 4B. After the tracking ID, timer, and QSC have been reset, the process proceeds to step 412 for the new candidate, and the face tracking is commenced according to the steps described above.

Quality Select Engine

As stated herein, in embodiments, a quality assurance or enhancement engine improves the accuracy and efficiency of face capture. FIG. 4B is a flow chart illustrating a quality assurance process 500 to obtain a maximum quality image for submitting in accordance with an embodiment of the invention. According to step 510, a quality select counter (QSC) value associated with the image is interrogated. The next step of the method is determined and based on the value of the QSC.

For example, according to the embodiment shown in FIG. 4B, if the QSC is zero (0), the method proceeds to step 514, and a quality metric is compared to a threshold value or range to evaluate whether the image is considered a 'pass' or 'no pass'. Examples of quality metrics include the face size, number of pixels of the face or object, time elapsed since tracking began, distance from the camera to the candidate, YPR, LP, and sharpness characteristics. If the image is considered a 'pass', the process proceeds to step 518 and the image is submitted for matching and the QSC is advanced by one (1). If the image is considered a 'no pass', the process proceeds directly to step 560 to determine whether to proceed to obtain more raw images 410 from the sensor or to proceed to step 420 to restart a new tracking candidate ID, restart the QSC, and reset the timer.

If the QSC is one (1), the method proceeds to step 520, which applies the quality metric threshold to evaluate whether the image is considered a 'pass' or 'no pass' as described above. If the image is considered a 'pass', the process proceeds to step 522 and the image is submitted (replacing the previously submitted or stored image) and the QSC is advanced by one (1). If the image is considered a 'no pass', the process proceeds directly to step 560 to determine whether to proceed to obtain more raw images 410 from the sensor or to proceed to step 420 to restart a new tracking candidate ID, restart the QSC, and reset the timer.

The quality enhancement process 500 can continue as described above until the QSC equals a $N_{MAX}$, at which point the image capture process for the instant candidate is terminated, and the process is restarted for a new candidate, and proceeds to step 420 in FIG. 4A. In embodiments, the quality enhancement process continues until the QSC (e.g., $N_{MAX}$) reaches 10, more preferably 2-5, and in one embodiment, $N_{MAX}$ is three (3).

Additionally, although FIG. 4B describes to submit or send the "pass" images, in other embodiments, the "pass" images are stored or saved and only a final image is ultimately submitted or sent for matching. In embodiments, determination of whether an image is a 'pass' or 'sent' can also be based on whether the instant image has a higher quality rating than the previous stored image. In embodiments, the instant image is only sent for matching (or stored) if it is better in quality than the previously stored image. The quality rating may be based on comparing YPR, blur, size, etc. However, as a practical matter, and as described herein, as the person moves towards the camera, the size of the face becomes larger in the image and the image quality shall generally be better. It follows that the image quality generally increases with time elapsed for the applications described herein. Thus, a wide range of techniques are operable to quickly maximize the image quality by selectively updating the stored or sent images with higher quality images.

Figure 5:
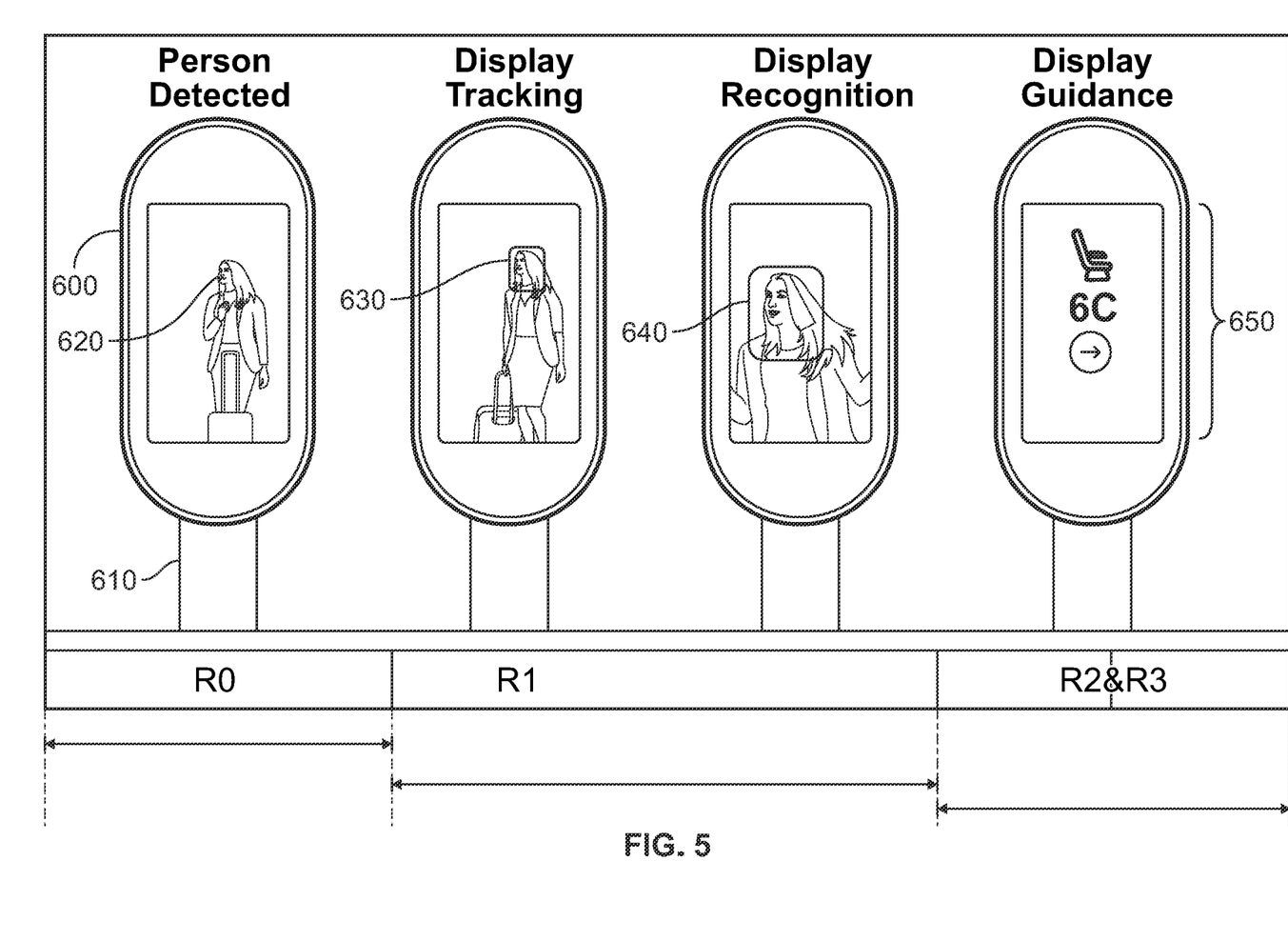
FIG. 5 is an illustration of various screen shots of a display in accordance with an embodiment of the invention.

FIG. 5 illustrates consecutive screen shots on a display 600 of a face recognition device 610 as a candidate 620 walks through various regions (R0, R1, R2, and R3) in accordance with embodiments of the invention.

As described above, during stage R0, the face recognition device 610 can continuously scan for people to detect. An instruction to 'walk' or center may be displayed on the face recognition device, or as shown in FIG. 5, a stream of raw images is sent to the display 600 including the person 620. As described above, the system simultaneously runs object detection software to detect the person 620 as she is moving.

The next screen shot shown in FIG. 5 is display tracking 630. Particularly, as the person 620 crosses into the region (R1), the face detection engine begins to track her face. FIG. 5 shows an optional graphic 630 overlaid on the image, enclosing her face as it is being tracked.

The next screen shot shown in FIG. 5 is display recognition 640. The process described above for submitting one or more optimal images has been carried out, and her face has been matched. Optionally, a stream of images may be frozen showing the largest face shot.

The next screen shot shown in FIG. 5 is guidance 650 as the person moves through area R2 and into R3. By this time in the process, her face has been matched to confirm her identity, and the display instructs her to proceed to her seat 6C. Although the display guidance shown in FIG. 5 is directed to a seat such as an airplane seat, the invention is not so limited except where recited in the appended claims. The instructions and guidance being displayed may vary widely in subject matter, application, text, graphics, and icons. It may be audio, visual, or and combinations thereof. Nonlimiting exemplary applications include transportation vehicles for people, arena venues, stadiums, border checkpoints, public parks, shopping malls, etc. Non-limiting exemplary text includes stop, go, pass, no pass, alert, etc. Non-limiting exemplary icons and graphics include signs to stop, go, pass, no pass, alert, traffic light, etc. Indeed, a wide range of subject matter, application, text, graphics may be displayed on the face recognition device 610.

Figure 6:
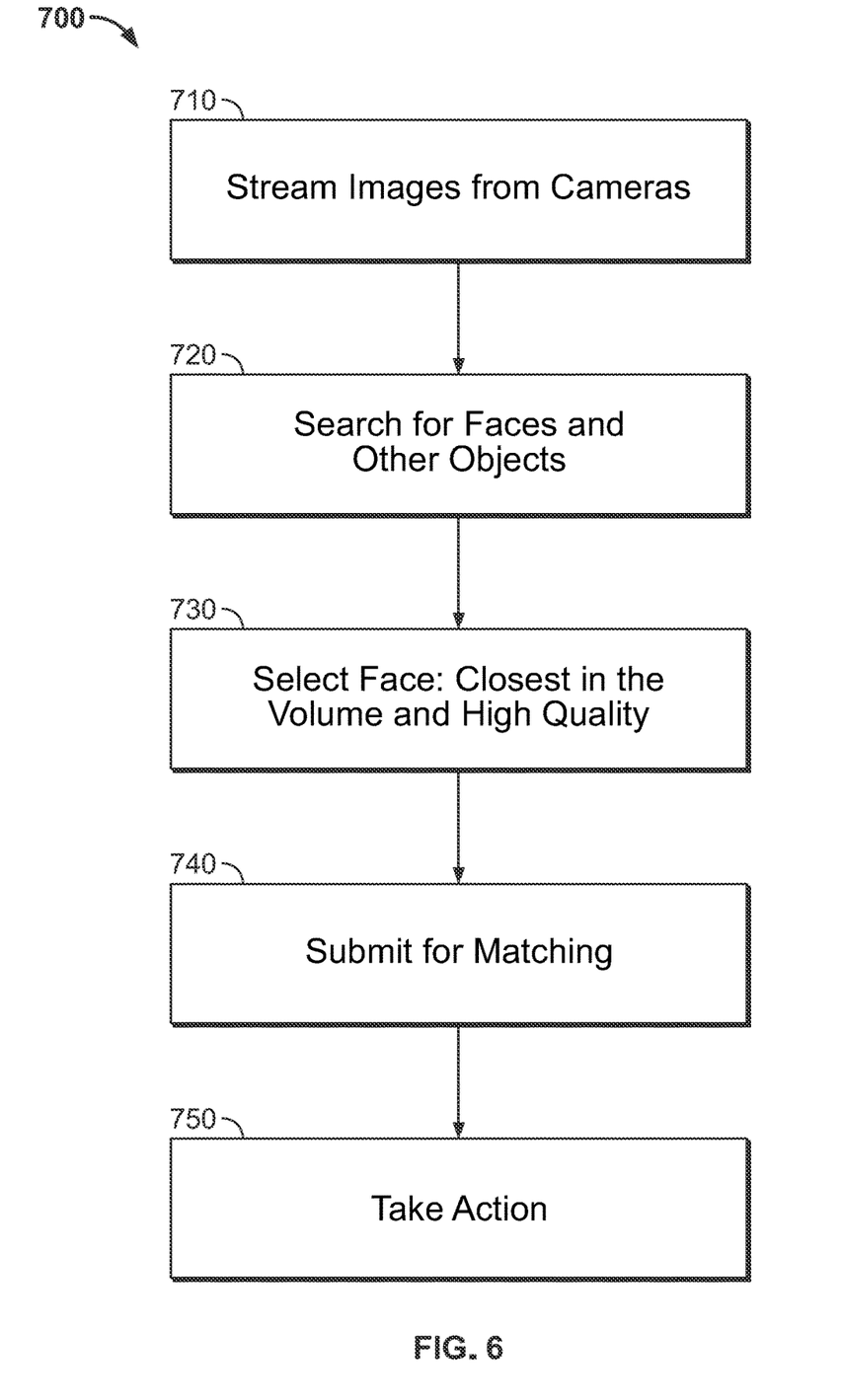
FIG. 6 is another flow chart of a face capture process in accordance with an embodiment of the invention for carrying out an action based on face matching.
Figure 7:
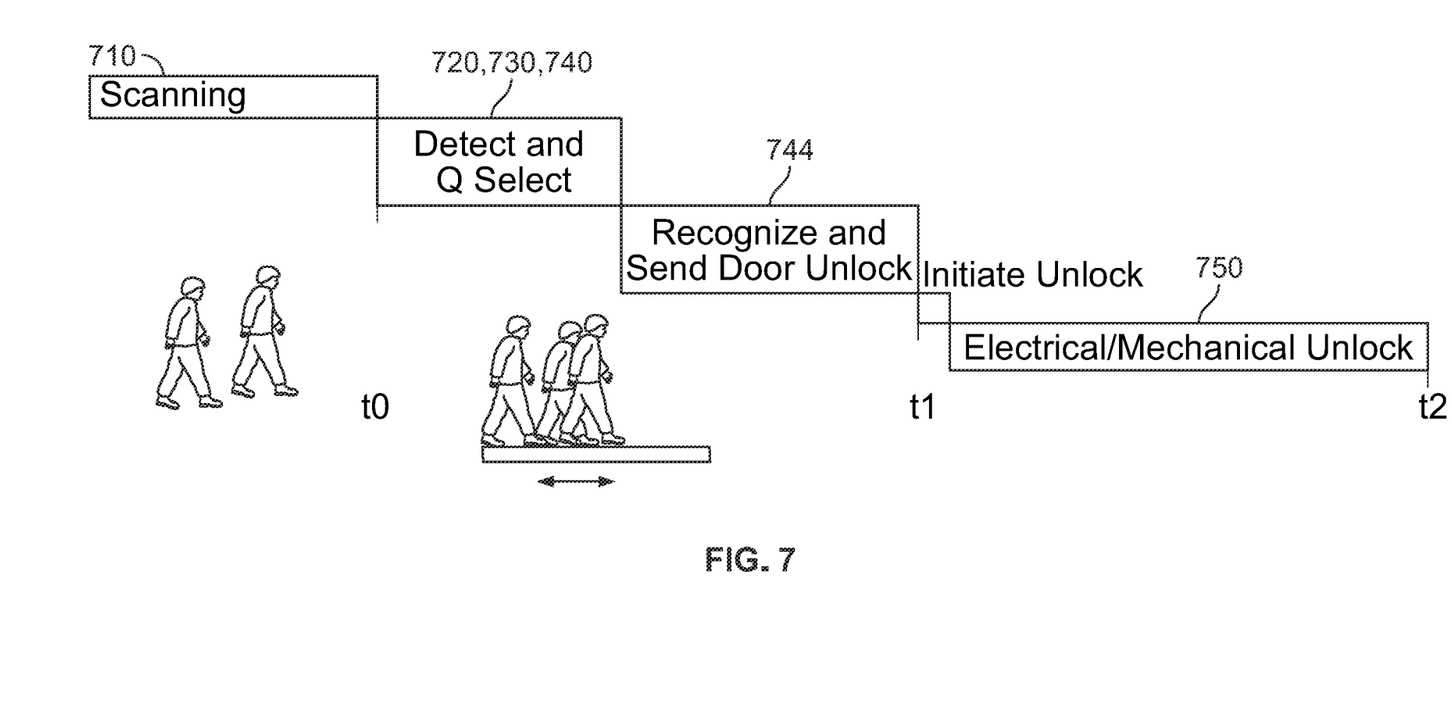
FIG. 7 is an illustration of a face capture system in accordance with an embodiment of the invention for carrying out an electrical or mechanical action based on face matching.

FIGS. 6-7 illustrate a process 700 for taking an action (e.g., unlocking a door) based on matching the submitted image with a confirmed image.

Initially, raw images are streamed from the cameras and the images are searched for a face (steps 710, 720).

The face is detected and tracked including applying a quality enhancement process to select and submit the face with a highest quality (steps 730, 740).

The image is matched using an image matching engine (step 740). Exemplary algorithms for image matching include, for example, the Algorithms evaluated by the NIST Face Recognition Vendor Test (FRVT).

After the match is confirmed, an action is taken such as to provide instructions to the person, notify another, or perform an electro- or mechanical physical action such as unlocking a door (step 750). Indeed, the system may send instructions or a signal to a controller to open a door to a hotel room, personal home, car, etc.

Additionally, in embodiments of the invention, enrollment, entry, or egress of confirmed individuals may be monitored by a state of system module. The system counts the number of people entering the designated area; maintains an image of each person entering the designated area; and maintains the person's ID, and more preferably, an anonymized ID of each person entering the designated area. The system further monitors whether a person has left the designated area such that at any time, the system tracks the total number of people in the designated area. The designated areas may be located in various types of facilities, stations, or vehicles including, without limitation, cruise ships, trains, buses, subways, arenas, airports, office buildings, and schools.

Additionally, with reference to FIG. 7, a timer can monitor time elapsed as the person walks through each area. In embodiments, the timer commences ($t_0$) for the person as she enters the detection phase (step 720). The system is configured to recognize or match her face by time ($t_1$), and to physically unlock the door by time ($t_2$). In embodiments, and by using components and steps as described herein, time ($t_1$) ranges from 1 to 10 seconds, and more preferably is 2-5 seconds, and in one embodiment is 2 seconds. In embodiments, and by using components and steps as described herein, time ($t_2$) ranges from 1 to 30 seconds, and more preferably is 5-10 seconds, and in one embodiment is 10 seconds.

Human Factors

Embodiments of the invention improve image capture using various human factors. Various human factors, whether an aspect of the face recognition device itself or a part of the overall system serve to optimize face capture and particularly, to increase the probability of obtaining a clear image of the person's face.

In a particular embodiment, the system includes guard rails, barriers, lines, or graphics to mark or physically limit the region (R) in which the person walks. Patterns and marks may be physically applied to the environment using paint, stickers, handrails, etc., or by an augmented reality projection system. Such augmented reality devices can remove unwanted features in the field of view and accentuate desired features in the field of view, optionally based on feedback from the camera. In one embodiment, arrows are projected along the floor to indicate the direction and path through the region. In another embodiment, handrails corral the person through a region which forces the individual to optimally approach the camera such that camera can obtain a clear view of the individual's face.

Notwithstanding the above, another difficulty is to encourage the subject to look in the direction of the camera. In embodiments, the display is used to assist the system to capture an image of the subject's face sufficient for recognition. A variety of operations (e.g., image transformations) can be employed to enhance human factors on the device display in accordance with the invention. The images may be presented to the candidate, the device operator, or both.

Examples of suitable image transformation include, without limitation, blurring (blurred around subject's face); cropping (face cropped image); configure face to line image; or configure face cartoon image. All of these images could be created and displayed in real-time to the subject or to the operator.

In embodiments, other types of transformations can include: unsharp masking; blurring; noise suppression; illumination adjustment; high dynamic range; rotation (roll) correction; emoji-type face representation; and animal-type face representation.

In embodiments, facial landmarks are used to define where to apply the various possible transformations. The dynamic facial landmarks could also be used as a way to provide display privacy. In place of the subject's face, one could display the points or the connected points of the facial landmarks. The lines connecting the facial landmark points could be smoothed to provide a smooth outline of dynamic facial features. The landmarks could be used to animate the emoji or animal face representations. Visual feedback could be provided to show the user head rotation, eyes open or closed, mouth open or closed.

The images displayed may be different from those images saved for face recognition. These transformations may be performed by image processing hardware (ISP) on the camera board or on the main processor board.

Although a number of embodiments have been disclosed above, it is to be understood that other modifications and variations can be made to the disclosed embodiments without departing from the subject invention.

The invention claimed is:

1. A face recognition method for identifying individuals based on a maximum quality image of the face of the individual as each individual moves through a designated area, the method comprising:
   (a) streaming images from at least one camera for each individual entering the designated area;
   (b) face detecting by searching the streamed images for a face until a face of an individual is detected;
   (c) face tracking by:
      (i) assigning a tracking ID and a quality select count to the individual;
      (ii) tracking the face of the individual to obtain at least one candidate image of the face of the individual as the individual moves through the designated area;
      (iii) timing the individual during tracking for an elapsed time;
      (iv) storing as the maximum quality image the at least one candidate image for face matching if an image quality metric is within a threshold quality range and higher than that of a previously-stored quality image; and
      (v) adjusting the quality select count for the individual based on whether the at least one candidate image was stored as the maximum quality image, wherein the quality select count corresponds to a total number of candidate images stored as the maximum quality image; and
   (d) maximizing image quality by repeating the face tracking step for each individual if the elapsed time is within a maximum time and the quality select count is within a threshold count range.

2. The method of claim 1, wherein the step of storing is carried out remotely from the designated area.

3. The method of claim 1, further comprising, subsequent to the step of maximizing image quality, face matching the maximum quality image with a validated image of the face of the individual.

4. The method of claim 1, wherein the step of maximizing is based on the quality image count being less than or equal to 5.

5. The method of claim 1, comprising displaying a live stream of images of the individual being tracked during the tracking step.

6. The method of claim 5, comprising superimposing graphics on the live stream of images of the individual being tracked to encourage the individual to look at the camera.

7. The method of claim 6, comprising terminating the tracking step for the individual when the elapsed time is equal to or greater than 2 seconds.

8. The method of claim 7, further comprising displaying an instruction to enter the designated area until tracking is commenced for a next individual.

9. The method of claim 1, wherein at least three (3) candidate images are generated during the step of tracking.

10. The method of claim 1, wherein the quality metric being selected from the group consisting of face size ($F_s$), Yaw Pitch Roll (YPR), and Laplacian Variance (LV).

* * * * *